US006990445B2

(12) United States Patent
Ky

(10) Patent No.: US 6,990,445 B2
(45) Date of Patent: Jan. 24, 2006

(54) SYSTEM AND METHOD FOR SPEECH RECOGNITION AND TRANSCRIPTION

(75) Inventor: Dung H. Ky, Plano, TX (US)

(73) Assignee: XL8 Systems, Inc., Dallas, TX (US)

( * ) Notice: Subject to any disclaimer, the term of this patent is extended or adjusted under 35 U.S.C. 154(b) by 0 days.

(21) Appl. No.: 10/022,947

(22) Filed: Dec. 17, 2001

(65) Prior Publication Data

US 2003/0130843 A1 Jul. 10, 2003

(51) Int. Cl.
G01L 15/26 (2006.01)
G01L 15/00 (2006.01)
G01L 21/00 (2006.01)
(52) U.S. Cl. .................. 704/235; 704/231; 704/275
(58) Field of Classification Search ............ 704/275, 704/256, 251, 239, 235, 231, 200, 1
See application file for complete search history.

(56) References Cited

U.S. PATENT DOCUMENTS

| | | | |
|---|---|---|---|
| 4,661,915 A | 4/1987 | Ott | 364/513.5 |
| 4,852,170 A | 7/1989 | Bordeaux | 381/41 |
| 4,955,056 A * | 9/1990 | Stentiford | 704/231 |
| 4,980,996 A | 1/1991 | Klink et al. | 381/41 |
| 4,994,996 A | 2/1991 | Fossum et al. | 364/748 |
| 5,170,432 A | 12/1992 | Hackbarth et al. | 381/43 |
| 5,208,897 A * | 5/1993 | Hutchins | 704/200 |
| 5,349,645 A | 9/1994 | Zhao | 395/2.52 |
| 5,390,278 A | 2/1995 | Gupta et al. | 395/2.52 |
| 5,440,663 A | 8/1995 | Moese et al. | 395/264 |
| 5,465,317 A | 11/1995 | Epstein | 395/2.45 |
| 5,465,378 A | 11/1995 | Duensing et al. | 395/800 |
| 5,594,834 A | 1/1997 | Wang | 395/2.62 |
| 5,596,679 A | 1/1997 | Wang | 395/2.45 |
| 5,625,749 A | 4/1997 | Goldenthal et al. | 395/2.63 |
| 5,640,490 A | 6/1997 | Hansen et al. | 395/263 |
| 5,675,788 A | 10/1997 | Husick et al. | 395/615 |
| 5,704,371 A | 1/1998 | Shepard | 128/897 |
| 5,708,759 A | 1/1998 | Kemeny | 395/2.63 |
| 5,729,694 A | 3/1998 | Holzrichter et al. | |
| 5,729,741 A | 3/1998 | Liaguno et al. | 395/615 |
| 5,751,905 A | 5/1998 | Chen et al. | 395/2.63 |
| 5,752,227 A | 5/1998 | Lyberg | 704/235 |
| 5,754,978 A | 5/1998 | Perez-Mendez et al. | 704/255 |
| 5,758,023 A | 5/1998 | Bordeaux | |

(Continued)

OTHER PUBLICATIONS

McNamara, "Technical Aspects of Data Communication," 1982, Digital Equipment Corporation, p. 3 and pp. 281-282.*

(Continued)

Primary Examiner—Richemond Dorvil
Assistant Examiner—V. P. Harper
(74) Attorney, Agent, or Firm—Swidler Berlin LLP

(57) ABSTRACT

The present invention comprises a method and system for speech recognition. The method includes the steps of receiving digital data representation of speech having at least one word, which includes a waveform representation of the at least one word. The method includes searching a library containing digital data representation of a plurality of words and matching the digital data representation of the at least one word to digital data representation of a word in the library. The method further includes the steps of determining the number of syllables in the digital data representation of the at least one word, and then providing an ASCII representation of the matched word in response to the number of syllables of the at least one word being identical to the number of syllables of the matched word in the library.

6 Claims, 4 Drawing Sheets

U.S. PATENT DOCUMENTS

| | | | |
|---|---|---|---|
| 5,772,585 A | 6/1998 | Lavin et al. | 600/300 |
| 5,787,230 A | 7/1998 | Lee | 395/2.44 |
| 5,794,189 A * | 8/1998 | Gould | 704/231 |
| 5,794,196 A | 8/1998 | Yegnanarayanan et al. | 704/255 |
| 5,799,276 A | 8/1998 | Komissarchik et al. | |
| 5,806,033 A | 9/1998 | Lyberg | 704/255 |
| 5,809,476 A | 9/1998 | Ryan | 705/2 |
| 5,822,730 A | 10/1998 | Roth et al. | 704/255 |
| 5,832,428 A | 11/1998 | Chow et al. | 704/254 |
| 5,862,519 A | 1/1999 | Sharma et al. | 704/231 |
| 5,864,804 A | 1/1999 | Kalveram | 704/233 |
| 5,884,261 A | 3/1999 | de Souza et al. | 704/255 |
| 5,899,974 A | 5/1999 | Corwin et al. | |
| 5,905,971 A | 5/1999 | Hovell | 704/257 |
| 5,920,835 A | 7/1999 | Huzenlaub et al. | 704/235 |
| 5,937,384 A | 8/1999 | Huang et al. | 704/256 |
| 5,937,422 A | 8/1999 | Nelson et al. | 707/531 |
| 5,987,409 A | 11/1999 | Tran et al. | 704/240 |
| 5,995,936 A | 11/1999 | Brais et al. | 704/275 |
| 6,067,520 A | 5/2000 | Lee | 704/270 |
| 6,092,039 A | 7/2000 | Zingher | 704/221 |
| 6,101,467 A | 8/2000 | Bartosik | 704/235 |
| 6,108,627 A | 8/2000 | Sabourin | |
| 6,122,614 A * | 9/2000 | Kahn et al. | 704/235 |
| 6,161,091 A | 12/2000 | Akamine et al. | |
| 6,163,768 A | 12/2000 | Sherwood et al. | 704/235 |
| 6,178,401 B1 | 1/2001 | Franz et al. | 704/255 |
| 6,185,531 B1 | 2/2001 | Schwartz et al. | 704/256 |
| 6,243,679 B1 | 6/2001 | Mohri et al. | 704/256 |
| 6,249,761 B1 | 6/2001 | Phillips et al. | 704/231 |
| 6,272,455 B1 | 8/2001 | Hoshen et al. | 704/1 |
| 6,275,801 B1 | 8/2001 | Novak et al. | 704/252 |
| 6,345,252 B1 | 2/2002 | Beigi et al. | 704/272 |
| 6,363,342 B2 | 3/2002 | Shaw et al. | 704/220 |
| 6,366,882 B1 | 4/2002 | Bijl et al. | 704/235 |
| 6,389,395 B1 | 5/2002 | Ringland | 704/254 |
| 6,421,645 B1 | 7/2002 | Beigi et al. | 704/272 |
| 6,424,946 B1 | 7/2002 | Tritschler et al. | 704/272 |
| 6,434,547 B1 | 8/2002 | Mishelevich et al. | 707/3 |
| 6,456,971 B1 | 9/2002 | Mohri et al. | 704/256 |
| 6,463,444 B1 | 10/2002 | Jain et al. | 707/104.1 |
| 6,490,561 B1 | 12/2002 | Wilson et al. | 704/251 |
| 6,507,643 B1 | 1/2003 | Groner | 379/88.14 |
| 6,510,410 B1 | 1/2003 | Chen et al. | 704/251 |
| 2001/0020226 A1 | 9/2001 | Minamino et al. | 704/251 |
| 2002/0010578 A1 | 1/2002 | Padmanabhan | 704/231 |
| 2002/0013705 A1 | 1/2002 | Jaepel et al. | 704/252 |
| 2002/0077817 A1 | 6/2002 | Atal | 704/254 |
| 2002/0099543 A1 | 7/2002 | Eman et al. | 704/235 |
| 2002/0099717 A1 | 7/2002 | Bennett | 707/102 |
| 2002/0120447 A1 | 8/2002 | Charlesworth et al. | 704/254 |
| 2002/0128844 A1 | 9/2002 | Wilson et al. | 704/270 |
| 2002/0133340 A1 | 9/2002 | Basson et al. | 704/235 |
| 2002/0143533 A1 * | 10/2002 | Lucas | 704/235 |
| 2002/0143538 A1 | 10/2002 | Takizawa | 704/254 |
| 2002/0156626 A1 | 10/2002 | Hutchison | 704/231 |
| 2002/0156627 A1 | 10/2002 | Itoh et al. | 704/254 |
| 2002/0165715 A1 | 11/2002 | Riis et al. | 704/254 |
| 2002/0173956 A1 | 11/2002 | Hartley et al. | 704/231 |
| 2002/0173958 A1 | 11/2002 | Asano et al. | 704/251 |
| 2002/0184024 A1 | 12/2002 | Rorex | 704/255 |
| 2002/0188452 A1 | 12/2002 | Howes | 704/270 |

OTHER PUBLICATIONS

Akhuputra, et al., "A Speaker-Independent Thai Polysyllabic Word Recognition Using Hidden Markov Model.," IEEE, 1997, pp. 593-599.

* cited by examiner

SYSTEM AND METHOD FOR SPEECH RECOGNITION AND TRANSCRIPTION

RELATED APPLICATION

The present patent application is related to co-pending U.S. patent application, entitled "SYSTEM AND METHOD FOR MANAGEMENT OF TRANSCRIBED DOCUMENTS." application Ser. No. 10/24,169, filed on Dec. 17, 2001.

TECHNICAL FIELD OF THE INVENTION

The present invention relates to the field of speech recognition and transcription.

BACKGROUND OF THE INVENTION

Speech recognition is a powerful tool for users to provide input to and interface with a computer. Because speech does not require the operation of cumbersome input tools such as a keyboard and pointing devices, it is the most convenient manner for issuing commands and instructions, as well as transforming fleeting thoughts and concepts into concrete expressions or words. This is an especially important input mechanism if the user is incapable of operating typical input tools because of impairment or inconvenience. In particular, users who are operating a moving vehicle can more safely use speech recognition to dial calls, check email messages, look up addresses and routes, dictate messages, etc.

Some elementary speech recognition systems are capable of recognizing only a predetermined set of discrete words spoken in isolation, such as a set of commands or instructions used to operate a machine. Other speech recognition systems are able to identify and recognize particular words uttered in a continuous stream of words. Another class of speech recognition systems is capable of recognizing continuous speech that follows predetermined grammatical constraints. The most complex application of speech recognition is the recognition of all the words in continuous and spontaneous speech useful for transcribing dictation applications such as for dictating medical reports or legal documents. Such systems have a very large vocabulary and can be speaker-independent so that mandatory speaker training and enrollment is not necessary.

Conventional speech recognition systems operate on recognizing phonemes, the smallest basic sound units that words are composed of, rather than words. The phonemes are then linked together to form words. The phoneme-based speech recognition is preferred in the prior art because very large amounts of random access memory is required to match words to sample words in the library, making it impracticable.

SUMMARY OF THE INVENTION

In accordance with an embodiment of the present invention, a method for speech recognition includes the steps of receiving digital data representation of speech having at least one word, and searching a library containing digital data representation of a plurality of words and matching the digital data representation of the at least one word to digital data representation of a word in the library. The method further includes the steps of determining the number of syllables in the digital data representation of the at least one word, and then providing an ASCII representation of the matched word in response to the number of syllables of the at least one word being identical to the number of syllables of the matched word in the library.

In accordance with another embodiment of the present invention, a method for speech recognition includes the steps of receiving digital waveform data representation of continuous speech having at least one word, and searching a library containing digital waveform data representation of a plurality of words and matching the digital waveform data representation of the at least one word to digital waveform data representation of a word in the library by matching at least waveform frequency, period and amplitude of the digital data representation of the at least one word to waveform frequency, period and amplitude of the digital waveform data representation of words in the library. The method further includes the steps of determining the number of syllables in the digital data representation of the at least one word, and providing an ASCII representation of the matched word in the library in response to the number of syllables of the at least one word being identical to the number of syllables of the matched word in the library.

In accordance with yet another embodiment of the present invention, a speech recognition system includes a digital representation of a user's spoken speech, and a waveform matching process operable to receive the digital speech representation and match the waveform characteristics to characteristics of model waveforms stored in a library. The matched model waveform each has an ASCII representation associated with each word in the spoken speech. The system further includes a syllable matching process operable to receive the digital speech representation and determine the number of syllables in each word in the spoken speech and also verify the matched model waveform. A display screen is operable to display the ASCII representation of the matched model waveform.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF THE DRAWINGS

The preferred embodiment of the present invention and its advantages are best understood by referring to FIGS. 1 through 5 of the drawings, like numerals being used for like and corresponding parts of the various drawings.

Figure 1A:
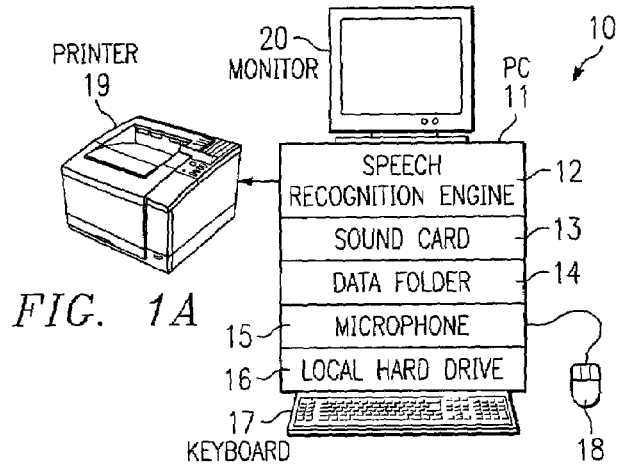
FIG. 1A to 1C are a top-level block diagrams of embodiments of a speech recognition system.

FIG. 1A is a top-level block diagram of one embodiment of a speech recognition system 10. As shown in FIG. 1A is a stand-alone speech recognition system 10, which includes a computer 11, such as a personal computer, workstation, laptop, notebook computer and the like. Suitable operating systems running on computer 11 may include WINDOWS, LINUX, NOVELL, etc. Other microprocessor-based devices, if equipped with sufficient computing power and speed, such as personal digital assistants, mobile phones, and other mobile or portable devices may also be considered as possible platforms for speech recognition system 10. Computer 11 executes a speech recognition engine application 12 that performs the speech utterance-to-text transformation according to the teachings of the present invention. Computer 11 is further equipped with a sound card 13, which is an expansion circuit board that enables a computer to receive, manipulate and output sounds. Speech and text data are stored in data structures such as data folders 14 in memory, such as random access memory (RAM), read-only memory (ROM), or other memory devices. Computer 11 is also equipped with a microphone 15 that is capable of receiving sound or spoken word input that is then provided to sound card 13 for processing. A local hard drive 16 may be also provided in computer 11 to store data associated with and used by speech recognition system 10 as well as speech recognition engine application itself. Transcribed reports may be stored in local hard drive 16. User input devices of computer 11 may include a keyboard 17 and a mouse 18. Hardcopy output devices of computer 11 may include a printer 19, facsimile machine, digital sender and other suitable devices. Not explicitly shown are speakers coupled to computer 11 for providing audio output from system 10. Sound card 13 enables computer 11 to output sound through the speakers connected to sound card 13, to record sound input from microphone 15 connected to the computer, and to manipulate the data stored in data files and folders. Speech recognition system 10 is operable to recognize spoken words either received live from microphone 15 via sound card 13 or from sound files stored in data folders 14 or local hard drive 16.

As an example, a family of sound cards from CREATIVE LABS, such as the SOUND BLASTER LIVE! CT4830 and CT4810 are 16-bit sound cards that may be incorporated in speech recognition system 10. System 10 can also take advantage of future technology that may yield 16+ bit sound cards that will provide even better quality sound processing capabilities. Sound card 13 includes an analog-to-digital converter (ADC) circuit or chip (not explicitly shown) that is operable to convert the analog signal of sound waves received by microphone 15 into digital representation thereof. The analog-to-digital converter accomplishes this by sampling the analog signal and converting the spoken sound to waveform parameters such as pitch, volume, frequency, periods of silence, etc. Sound card 13 may also include sound conditioning circuits or devices that reduce or eliminate spurious and undesirable components from the signal. The digital speech data is then sent to a digital signal processor (DSP) (not explicitly shown) that processes the binary data according to a set of instructions stored on the sound card. The processed digital sound data is then stored to a memory or storage device, such as memory, a hard disk, a CD ROM, etc. In the present invention, speech recognition system 10 includes software code that may receive the processed digital binary data from the sound card or from the storage device to perform the speech recognition function.

Figure 1B:
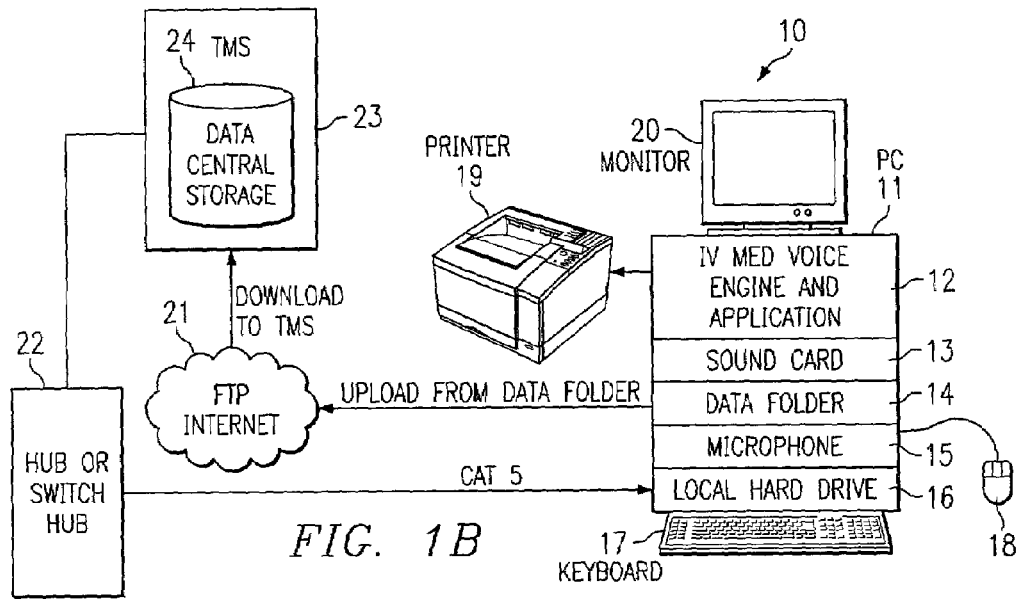

Referring to FIG. 1B, speech recognition system 10 may be in communication, via a computer network 21 and an interface such as a hub or switch hub 22, with a transcription management system (TMS) 23 operable to manage the distribution and dissemination of the transcribed speech reports. Computer network 21 may be a global computer network such as the Internet, intranet or extranet, and is used to transfer and receive data, commands and other information between speech recognition system 10 and transcription management system 23. Suitable communication protocols such as the File Transfer Protocol (FTP) may be used to transfer data between the two systems. Computer 11 may upload data to system 23 using a dial-up modem, a cable modem, an ISDN converter, or like devices (not explicitly shown). The file transfer between systems 10 and 23 may be initiated by either system to upload or download the data. Transcription management system 23 includes a computer and suitable peripherals such as a central data storage 24 which houses data related to various transcription report recipients, the manner in which the transcription reports should be sent, and the transcription reports themselves. Transcription management system is capable of transmitting the transcription reports to the intended recipients via various predetermined modes, such as electronic mail, facsimile, or via a secured web site, and is further capable of sending notifications via pager, email, facsimile, and other suitable manners. Transcription management system 23 is typically in communication with multiple speech recognition systems 10 that perform the speech-to-text function.

Figure 1C:
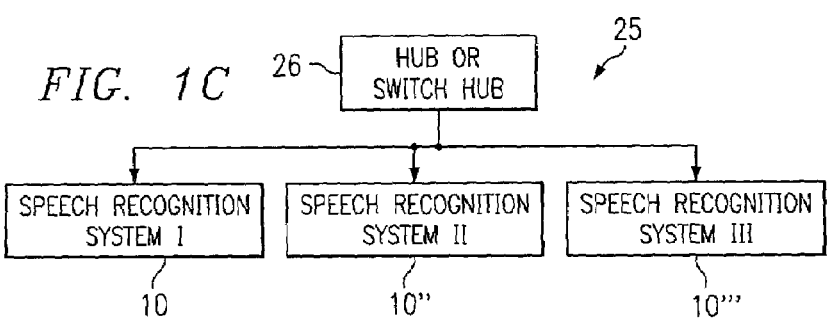

FIG. 1C is a simplified block diagram of a yet another embodiment of the speech recognition system. A network such as a local area network (LAN), wide area network (WAN) using a connection such as Category 5 cable, T1, ISDN, dial-up connection, virtual private network (VPN), with a hub or switch hub 26 may be used to interconnect multiple speech recognition systems 10, 10", 10''' to facilitate file and data sharing. Any one or more of systems 10, 10", 10''' may be similarly configured to communicate with a transcription management system such as shown in FIG. 1B.

Figure 2:
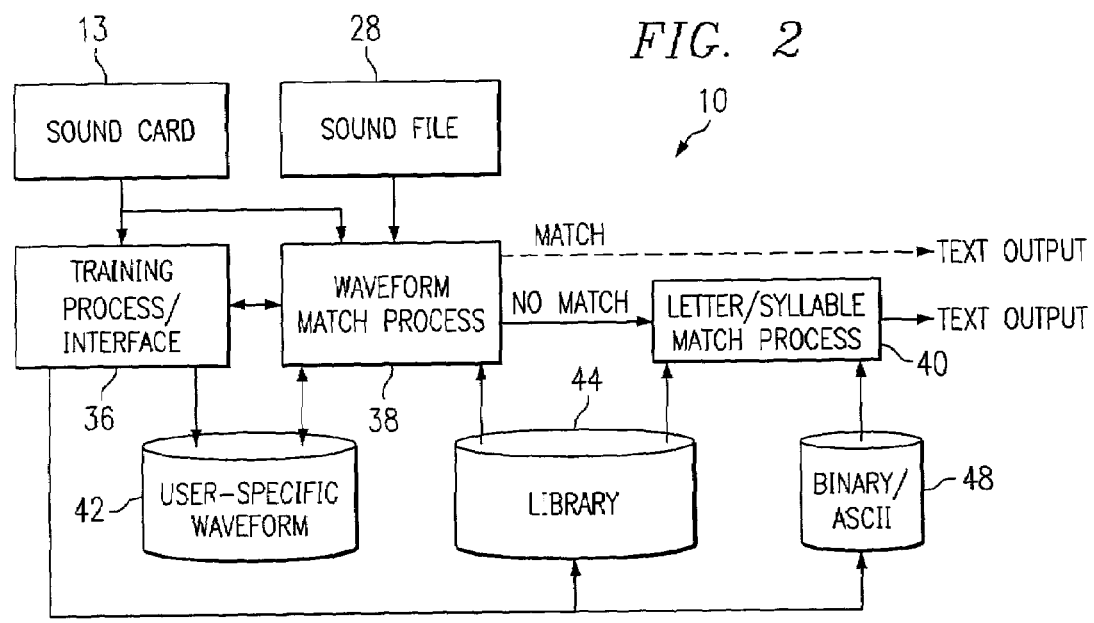
FIG. 2 is a functional block diagram of an embodiment of the speech recognition system according to the teachings of the present invention.

FIG. 2 is a functional block diagram of an embodiment of the speech recognition system according to the teachings of the present invention. The speech recognition system of the present invention is operable to convert continuous natural speech to text, where the speaker is not required to pause deliberately between words and does not need to adhere to a set of grammatical constraints. Digital binary data and digital representation of the speech waveform from sound card 13 is used as input to a training interface 36, waveform match process 38 and letter/syllable match process 40 of speech recognition system 10. During the training or speaker enrollment process, a user-specific waveform library 42 is built by storing the digital data associated with the received speech waveform of a particular speaker. Waveform match process 38 compares parameters such as wave amplitude, frequency, period, etc. of the user's speech waveform to model waveforms of known words stored in a library 44. If there is a match of the uttered waveform to a model waveform stored in library 44, then the word associated with the matched model waveform is provided as text output. However, the system of the present invention further improves the accuracy of speech recognition by allowing a personalized waveform library to be built from training sessions and by further analyzing the uttered word's other characteristics, such as the number of syllables in letter/syllable process 40.

Letter/syllable match process 40 also analyzes the uttered word if there was not a successful waveform match in process 38. The binary bit stream received from sound card 22 or obtained from sound file 28 is parsed and converted to ASCII representations of the letters in each word by consulting a binary/ASCII table 48. The words are further analyzed to determine the number of syllables and used as another match criterion. Library 44 contains words that are searchable alphabetically, the number of syllables in each word, and notations indicating whether any word has been trained by particular users. Finally, the matched word is provided as text output on the screen, or executed as a command, such as new line, new paragraph, all caps, etc. Although word/syllable table 48 and user-specific waveform library 42 are shown in FIG. 2 separately from library 44, either or both databases may be implemented as a part of library 44 for efficiency, speed, space and other considerations if so desired.

Library 44 preferably contains corresponding speech waveforms and words that are commonly used by the particular user for a specific industry or field of use. For example, if the user is a radiologist and speech recognition system 10 is used to dictate and transcribe radiology or other medical reports, library 44 would contain additionally a vocabulary anticipatory of such use. On the other hand, if speech recognition system 10 will be used by attorneys in their legal practice, for example, library 44 would contain legal terminology that will be encountered in its use.

Figure 3:
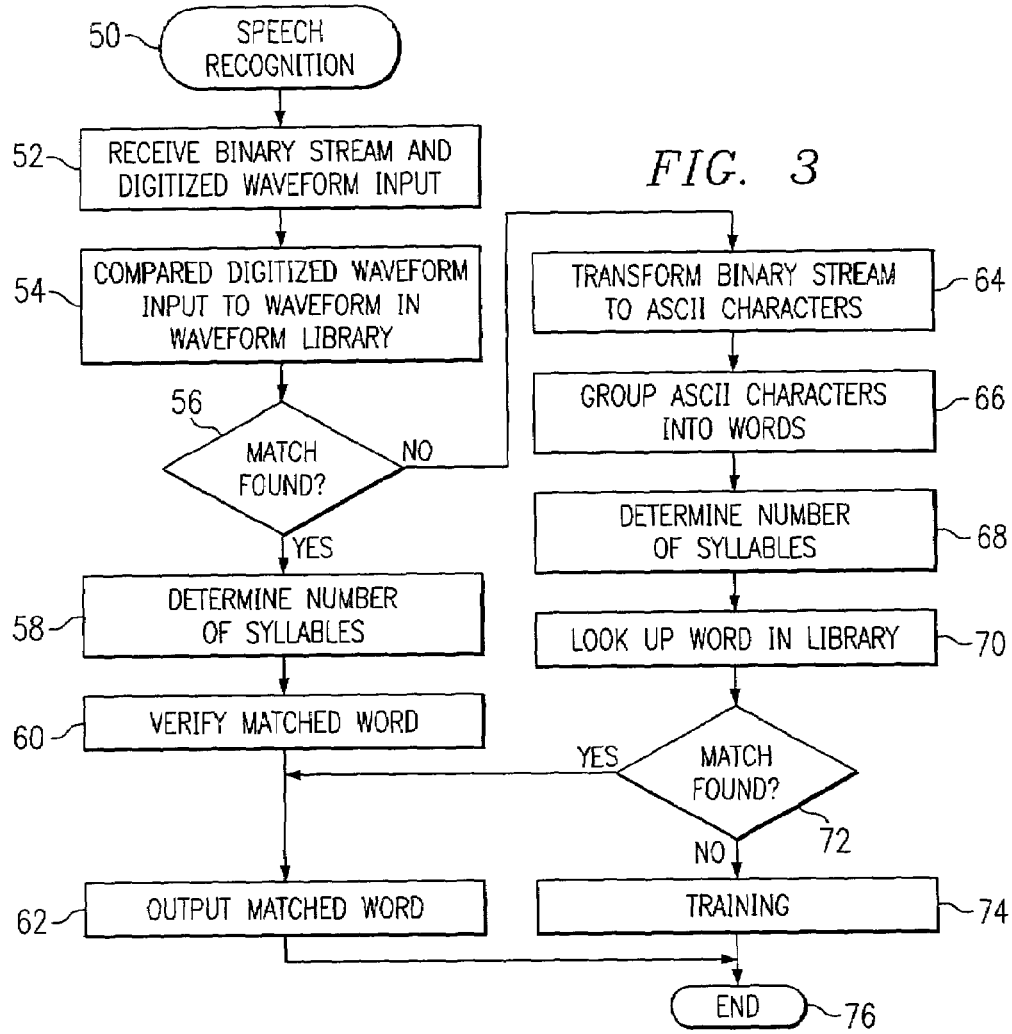
FIG. 3 is a flowchart of an embodiment of the speech recognition process according to the teachings of the present invention.
Figure 5A:
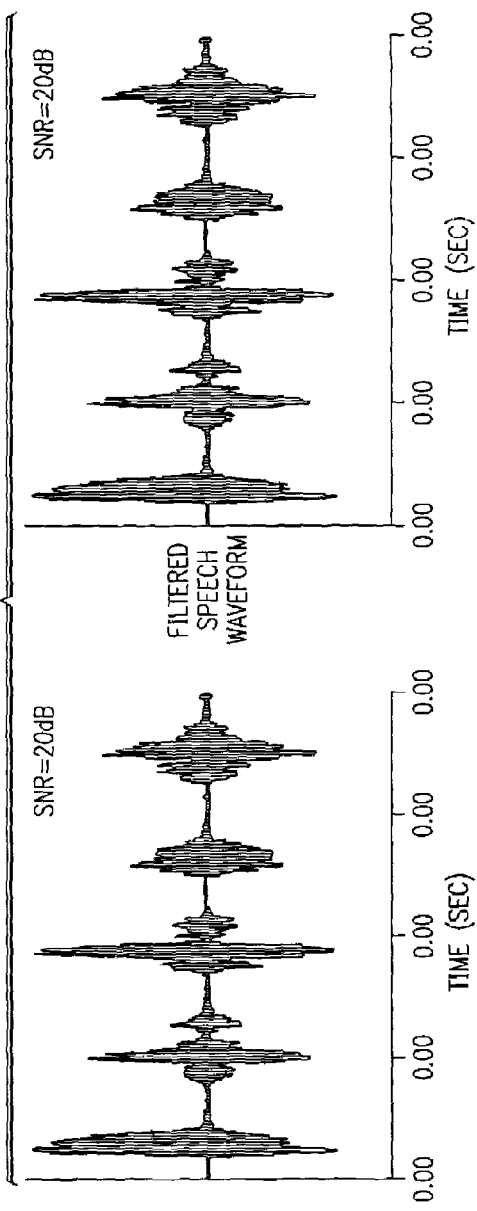
FIGS. 5A to 5C are time varying waveforms of the words "Hello Joshua" uttered by three different individuals of both sexes.

FIG. 3 is a simplified flowchart of an embodiment of the speech recognition process 50 according to the teachings of the present invention. Speech input is received from sound card 13 or obtained from sound file 28 in the form of a digitized waveform and a binary bit stream, as shown in block 52. The received digitized waveform is compared with the stored model waveforms in library 44, as shown in block 54. Waveform parameters such as amplitude, frequency, period, etc. are used in the comparison. A technique commonly called code excited linear prediction (CELP) may be used to perform the waveform matching function as known in the art.

If a waveform match has been found, as a further assurance of accuracy, the waveform may be analyzed to determine the number of syllables in block 58. The syllable analysis process may be executed according to a confidence level rating or assessment of the waveform matching result. For example, if the confidence level is high that the match is correct, then the syllable analysis process may not be necessary. In block 60, the number of syllables of the received speech waveform is used to verify the previously matched word in library 44. If the two words have the same number of syllables, then the matched word is provided as an output text, as shown in block 62.

If there is no identical match in the matching process of block 56, a short list of words that are the closest match may be displayed on the screen to allow the user to select a word. The selection of a word would create an association of that word in library 44 or user-specific waveform library 42 with the received speech waveform. Currently known and future techniques to relate stored data elements may be used to correlate the speech waveform and the word in the library, such as using a relational database.

If none of the displayed words is a match, then the digital binary stream is mapped to the ASCII representation of the word, character-by-character, by consulting a binary/ASCII database 46, as shown in block 64. The digital data stream from the sound card is parsed to extract the binary bits for each letter in the uttered word. The parsed binary bits are then used to look up in the binary/ASCII table to determine the ASCII representation of each letter. The binary bit stream is thus transformed into a letter stream. The letter stream is then parsed according to boundaries between words, as shown in block 66. The word boundaries are characterized by binary bits that represent a space or silence between words.

For example, for a 16-bit sound card, each 16 bits of binary speech data output in the binary bit stream can be mapped to one ASCII character. However, in the present embodiment, only the meaningful least significant 8 bits, for example, out of 16 bits are used to convert to the corresponding ASCII character. In one embodiment, the binary bits "00100000" represent the space character in ASCII. As an example, the user speaks the words "Hello Joshua." When speech recognition system 10 receives the binary bit stream from the sound card or sound file, only a subset of bits, such as 8 bits, are needed from each 16-bit group in the binary bit stream for speech recognition. Therefore, the received binary bit stream may be:

01001000|01100101|01101100|01101100|01101111|001000 00|01001010|01101111|01110011|01101000|01110101|0 1110101|01100001 where "|" is used herein to clearly demarcate the boundaries between the binary bit groups for the letters increased clarity but does not represent a data output from the sound card. When binary/ASCII table 46 is queried, the following binary to ASCII mapping is determined for the above bit stream:

| Binary Bits | Character | ASCII |
| --- | --- | --- |
| 01001000 | H | 72 |
| 01100101 | e | 101 |
| 01101100 | l | 108 |
| 01101100 | l | 108 |
| 01101111 | o | 111 |
| 00100000 | space | 32 |
| 01001010 | J | 74 |
| 01101111 | o | 111 |
| 01110011 | s | 115 |
| 01101000 | h | 104 |
| 01110101 | u | 117 |
| 01100001 | a | 97 |

The Appendix is a table for the binary to ASCII mapping of the lower and upper cases of the alphabet and other commonly used symbols and numbers. Upper case letters are sometimes determined by grammar or syntax, such as a person's name, a city name, or at the begining of a sentence, for example. Symbols such as ".,;:!? and # require the user to use a command, such as "open quotation" for inserting a "symbol.

The received speech waveform is further analyzed to determine how many syllables are in each uttered word, as shown in block 68. It may be seen in the time varying waveforms of three individuals uttering the words "Hello Joshua" in FIGS. 5A–5C that the presence of each syllable can be easily identified and counted. The number of syllables along with the ASCII representation for the word is also used as a match characteristic or search index when a word/syllable table 48 is queried for a match, as shown in block 70. Although word/syllable table 48 is shown in FIG. 2 AS separate from library 44, library 44 may encompass the contents thereof to facilitate searching. Accordingly, the words may be arranged alphabetically according to the number of syllables in each word. An example of selected entries of the library is shown below:

| Words | Syllable | Abbr. | Library Train | User | Main entry | Key Tag | Command |
|---|---|---|---|---|---|---|---|
| Hello | 2 (h&-'lO, he-) | * | * | | hel•lo | * | |
| Centimeter | 4 ('sen-t&-"mE-t&r | cm | * | | cen•ti•me•ter | * | |
| Reach | 1 (rEch) | * | Reach (A) | A, B | reach | */** | |
| Axial | 3 ('ak-sE-&1) | * | * | | ax•i•al | * | |
| Millimeter | 4 ('mi-l&-"mE-t&r) | mm | Millimeter (B) | B | mil•li•me•ter | */** | |
| What | 1('hwät) | * | | | what | * | |
| pancreas | 3 'pa[ng]-krE-&s | | Pancreas (A) | A | pan•cre•as | */** | |
| visceral | 3 ('vi-s&-r&1) | | Visceral (C) | C | vis•cer•al | */** | |
| All-Caps-On | | | | | | *** | Ucase |
| All-Caps-Off | | | | | | *** | Lcase |
| New Paragraph | | | | | | *** | New Section |

The notations are defined as:
*meaning the particular word is in the library;
**meaning the particular word already exists in the library but has been specifically trained by a particular user because of trouble with the recognition of that word in the existing library;
***meaning the particular word is in the library but is designated as commands to be executed, not provided as output text. If more than one user has trained on a particular word, the corresponding user column entry would identify all the users. The correct waveform supplied by the current user is the one retrieved and used in waveform matching during speech recognition. It may be seen that the library entries for words commonly used in their abbreviated versions, such as centimeter/cm, millimeter/mm, include the respective abbreviations. The user may optionally select to output the abbreviations in the settings of the system whenever a word has an abbreviation in the library.

If a match is found in block 72, then the matched word is provided as text output. If a sufficiently close or identical match cannot be found, then the user is prompted to train the system to recognize that word, as shown in block 74. The user is prompted to spell out the word so that it may be stored in library 44 along with the digitized waveform and binary data stream of the word. Details of the training process are shown in a flowchart in FIG. 4.

Figure 4:
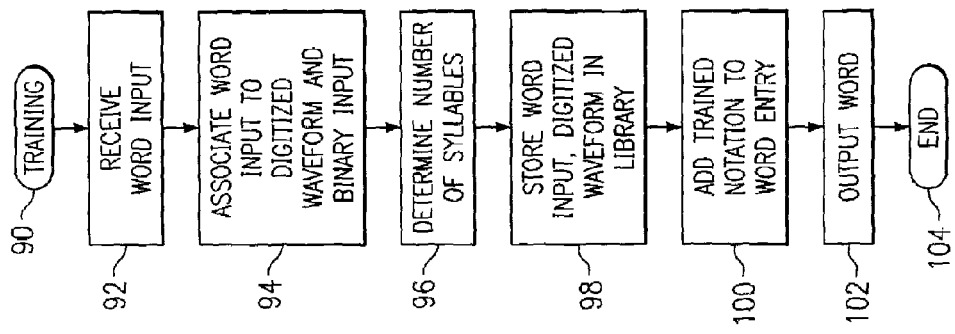
FIG. 4 is a flowchart of an embodiment of the training process of the speech recognition system according to the teachings of the present invention.
Figure 5B:
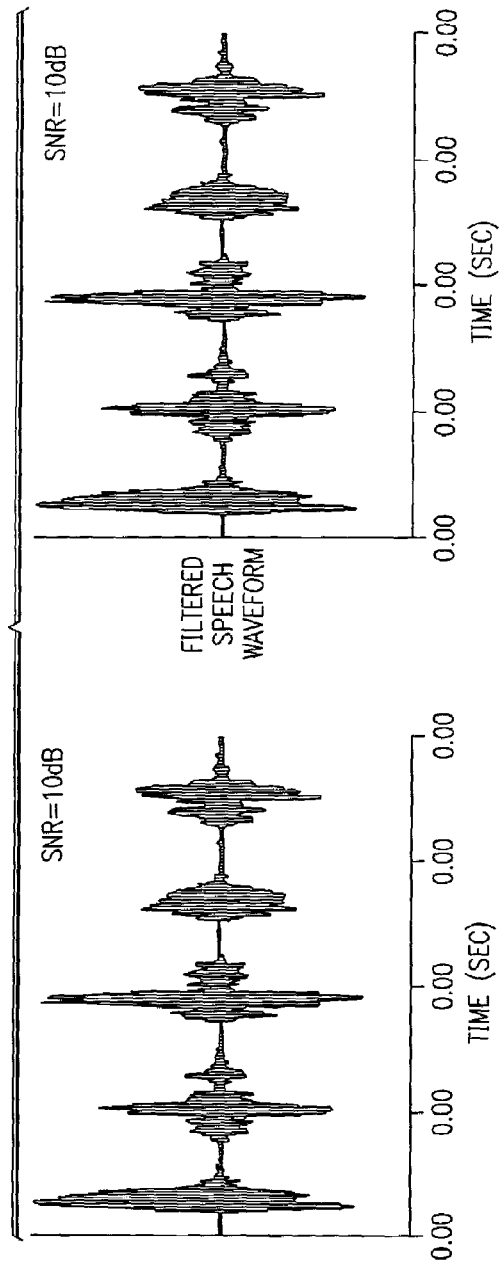
Figure 5C:
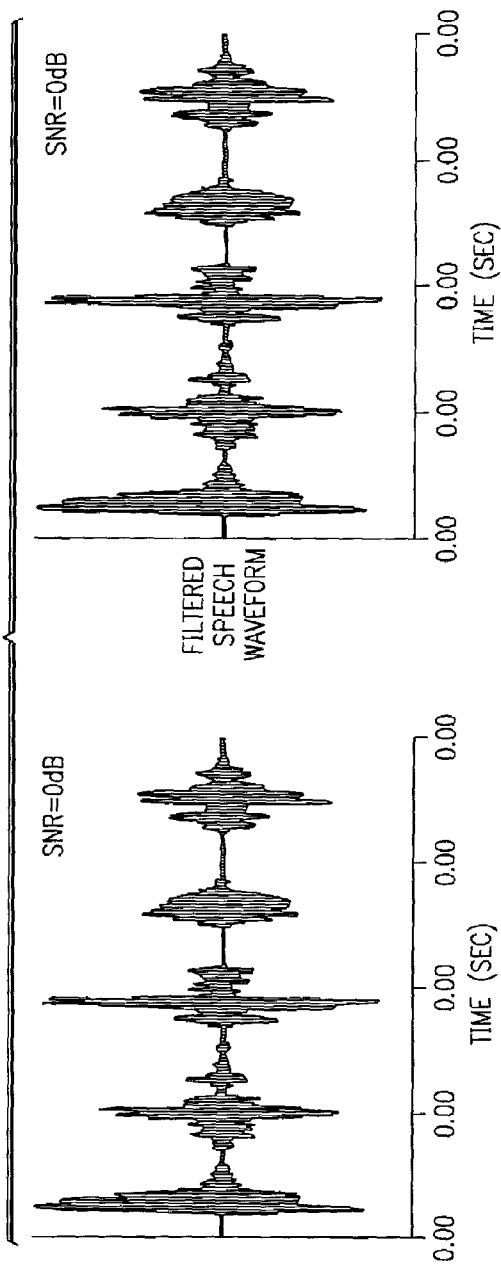

FIG. 4 is a flowchart of an embodiment of a training process 90 of the speech recognition system according to the teachings of the present invention. The training process may be entered into automatically and/or at the request of the user. For example, the user may issue a keyboard or verbal command to spell out a word, which directs speech recognition system 10 to enter into the training mode. The user is prompted to enter the word via a keyboard or by speaking the letters that make up the word, as shown in block 92. The received audio waveform of each uttered letter is then received and a determination of a letter representation is made for each utterance by waveform match process 38 (FIG. 2), where the library contains model waveforms of the letters of the alphabet. The spelled-out word is then stored in association with the previously received speech waveform of the word in the library.

During the speaker training or enrollment process, the digital speech data is also mapped to the ASCII representation of the word character-by-character by consulting a binary/ASCII database 46 (FIG. 2), as shown in block 94. The digital data stream from the sound card is parsed to extract the binary bits for each letter in the uttered word. The parsed binary bits are then converted to the ASCII representation of each letter. The letter stream is then parsed according to boundaries between words. The word boundaries are characterized by binary bits that represent a space or silence between words.

The received speech waveform is further analyzed to determine how many syllables are in the uttered word, as shown in block 96. As shown in the time varying waveforms shown in FIGS. 5A–5C, a syllable is characterized by a tight grouping of peaks exceeding a predetermined amplitude and separated from other syllables by waveforms having zero or ver small amplitudes. Thus, the presence of each syllable can be easily identified and the syllables counted.

The received word input, digitized waveform and the number of syllables for the word are associated with one another and stored in library 44 (or in the appropriate database or tables), as shown in block 98. An appropriate notation is further associated with the word to indicate that a particular user has provided user-specific waveform for the particular word, as shown in block 100. The word is then provided as a text output onto the screen, as shown in block 102. The training process ends and returns in block 104 to the speech recognition process in FIG. 3. Of course, the speech recognition process of FIGS. 3 and 4 continue until the dictation session is terminated by the user.

It may be seen from the foregoing that speech recognition system 10 of the present invention uses several matching and analysis techniques to improve the accuracy of the system. The speech waveform is first analyzed and used to match model waveforms, then the binary digit data from the sound card is analyzed and mapped to ASCII if waveform matching is unsuccessful. The number of syllables in the words is also used as a further characteristic of the speech to determine a match. The user is involved to interact with the system to build a user-specific waveform library to further improve the accuracy of the system. Speech recognition performance is improved because digital binary matching is used.

Speech recognition system 10 can be easily adapted to languages other than English. A binary conversion table for the target language instead of ASCII is needed to adapt system 10 to another language. Languages not based on an alphabet system can be adapted because the tone or waveform of the spoken words is used for matching.

While the invention has been particularly shown and described by the foregoing detailed description, it will be understood by those skilled in the art that mutations, alterations, modifications, and various other changes in form and detail may be made without departing from the spirit and scope of the invention.

What is claimed is:

1. A method for speech recognition, comprising:
   receiving a digital data representation of speech having at least one word as a waveform and a digital binary bit stream;
   analyzing the digital data waveform representation for at least one parameter and comparing the at least one parameter with a parameter of digital data representations corresponding to words stored in a library;
   determining a set of ASCII characters based on the analyzed digital data waveform representation;
   determining the number of syllables in the speech having the at least one word based on the digital data waveform representation;
   determining whether the set of ASCII characters corresponds to the speech having the at least one word by matching the number of syllables determined for the digital data waveform representation with the number of syllables for the word stored in the library;
   if the number of syllables do not match,
      grouping the digital representation of speech binary bit stream into subsets;
      mapping each subset of the digital representation of speech into a character representation of speech and generating a stream of character representations from the digital representation;
      parsing the stream of character representations to group the character representations of speech into words.

2. The method as set forth in claim 1, further comprising:
   receiving specific input having at least some of the ASCII characters corresponding to the mapping of the digital data representation of the speech having the at least one word;
   storing the input; and
   associating the input including at least some ASCII characters with the received digital data representation of the speech having the at least one word.

3. The method as set forth in claim 2 wherein the input is received from a keyboard.

4. The method as set forth in claim 2 wherein the input received is user auditory input from a sound card.

5. The method as set forth in claim 1, further comprising matching the digital data representation of the speech having the at least one word as a waveform to a digital data representation in the library based on at least one of: waveform frequency, period and amplitude.

6. A speech recognition system, comprising:
   a digital data representation of speech having at least one word;
   an interpreter operable to analyze the waveform a digital data representation of speech having at least one word, determine a set of ASCII characters based on the analyzed digital data representation;
   a syllable matching process operable to analyze the digital data representation waveform of the speech having the at least one word, determine the number of syllables in each word in the of speech having the at least one word, and determine whether the set of ASCII characters corresponds to the speech having the at least one word by matching the determined number of syllables with the number of syllables for the word selected from the library;
   if the number of syllables do not correspond,
      grouping the digital representation of speech binary bit stream into subsets;
      mapping each subset of the digital representation of speech into a character representation of speech and generating a stream of character representations from the digital representation; and
      parsing the stream of character representations to group the character representations of speech into words; and
   a display screen operable to display the set of ASCII characters.

* * * * *